US009121456B2

(12) United States Patent
Luipold et al.

(10) Patent No.: US 9,121,456 B2
(45) Date of Patent: Sep. 1, 2015

(54) ONE-WAY CLUTCH CARRIER ASSEMBLY

(71) Applicant: Schaeffler Technologies GmbH & Co. KG, Herzogenaurach (DE)

(72) Inventors: Chris Luipold, Wadsworth, OH (US); Matthew Frary, Burbank, OH (US); Jeffrey Hemphill, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/191,882

(22) Filed: Feb. 27, 2014

(65) Prior Publication Data
US 2014/0246286 A1    Sep. 4, 2014

Related U.S. Application Data

(60) Provisional application No. 61/771,626, filed on Mar. 1, 2013.

(51) Int. Cl.
*F16D 41/06* (2006.01)
*F16D 47/04* (2006.01)
*F16D 13/68* (2006.01)

(52) U.S. Cl.
CPC .............. *F16D 13/683* (2013.01); *F16D 41/06* (2013.01); *F16D 47/04* (2013.01)

(58) Field of Classification Search
CPC ....................................................... F16D 47/04
USPC ........................................................ 192/48.3
See application file for complete search history.

(56) References Cited

U.S. PATENT DOCUMENTS

| 4,509,381 | A | * | 4/1985 | Ikemoto et al. ................. 74/413 |
| 4,792,028 | A | * | 12/1988 | Nishimura et al. ......... 192/41 A |
| 4,930,610 | A | * | 6/1990 | Akai et al. .................... 192/223 |
| 5,638,936 | A | * | 6/1997 | Kinoshita et al. ........ 192/113.32 |
| 6,006,881 | A | * | 12/1999 | Lederman et al. ....... 192/45.014 |
| 7,690,488 | B2 |  | 4/2010 | Ploetz et al. |

(Continued)

FOREIGN PATENT DOCUMENTS

| JP | 02278061 |  | 11/1990 |
| JP | 10311349 | A | 11/1998 |

(Continued)

OTHER PUBLICATIONS

International Search Report for PCT/US2014/019021, mailed Jun. 25, 2014 by Korean Intellectual Property Office.

*Primary Examiner* — Jacob S Scott
(74) *Attorney, Agent, or Firm* — Kathryn A. Warner; Kevin L. Parks

(57) ABSTRACT

A one-way clutch carrier assembly for a transmission includes an outer ring and a carrier. The outer ring has an outer surface with radially extending teeth. The carrier circumscribes the outer ring. The carrier has an undulating outer surface with teeth for receiving a plurality of clutch plates, an undulating inner surface with teeth for receiving the outer ring teeth, and an inwardly extending tab for limiting axial displacement of the outer ring in the carrier. In an example embodiment, the outer ring includes a first circumferential surface with a first radius and a second circumferential surface with a second radius, larger than the first radius. The carrier inwardly extending tab has a third radius that is smaller than the second radius.

13 Claims, 5 Drawing Sheets

(56) References Cited

U.S. PATENT DOCUMENTS

| | | |
|---|---|---|
| 8,491,439 B2 * | 7/2013 | Kimes .......................... 475/324 |
| 2004/0035668 A1 | 2/2004 | Prater |
| 2010/0022343 A1 | 1/2010 | Samie |
| 2010/0137096 A1 | 6/2010 | Illerhaus et al. |
| 2013/0126290 A1 * | 5/2013 | Parameswaran et al. ....................... 192/45.001 |
| 2014/0202821 A1 * | 7/2014 | Schotten ..................... 192/45.1 |

FOREIGN PATENT DOCUMENTS

| | | |
|---|---|---|
| JP | 06200690 A | 8/2006 |
| WO | WO 2011072634 A1 * | 6/2011 |

* cited by examiner

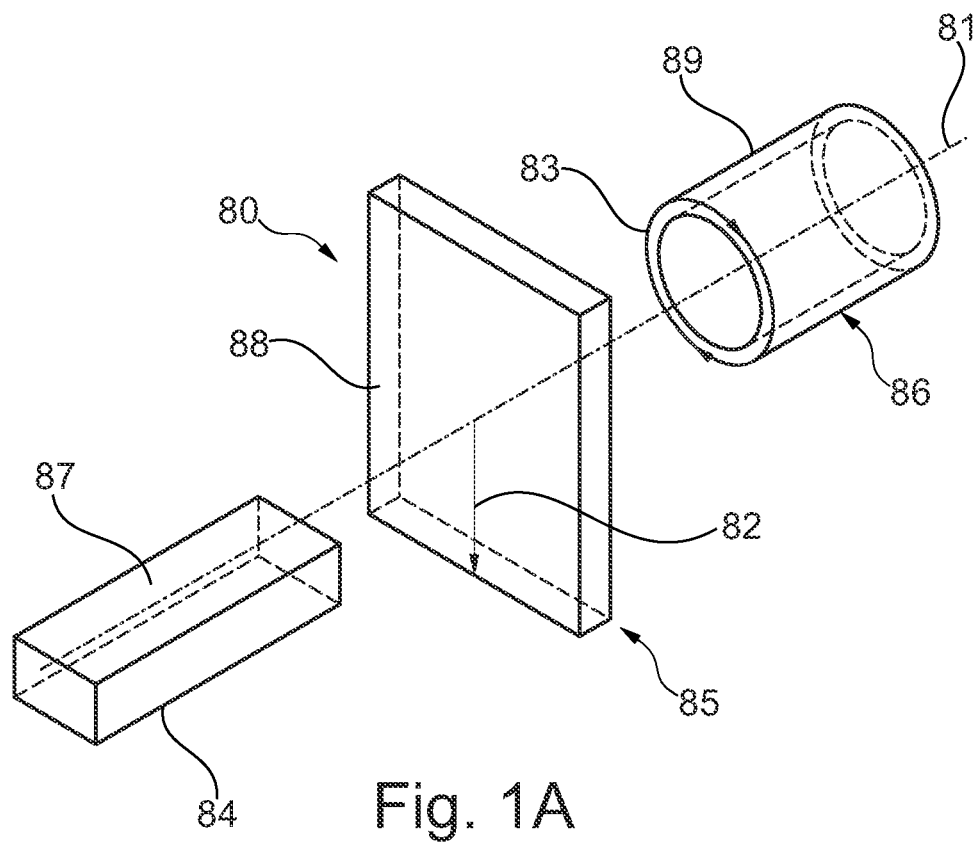
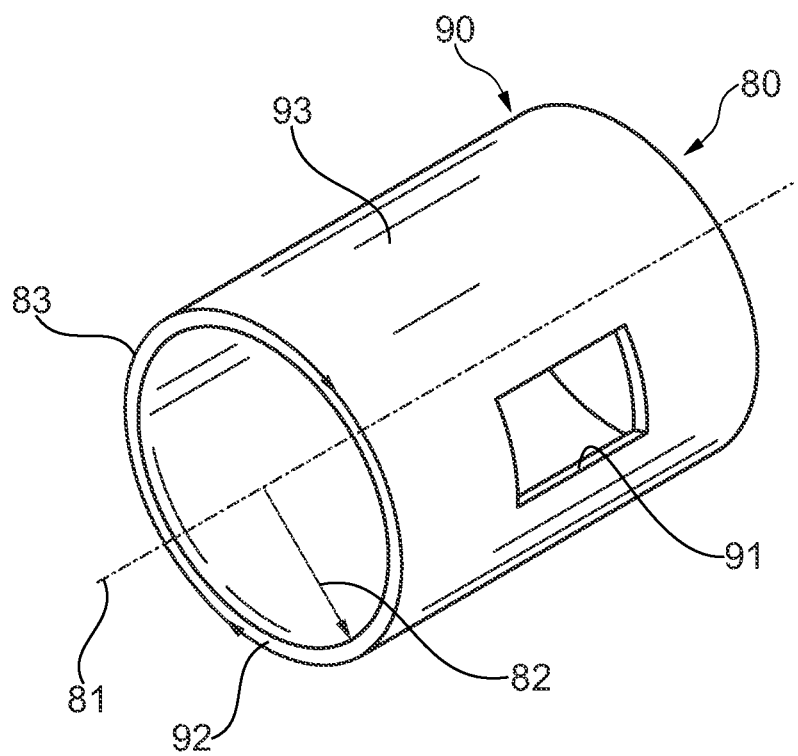

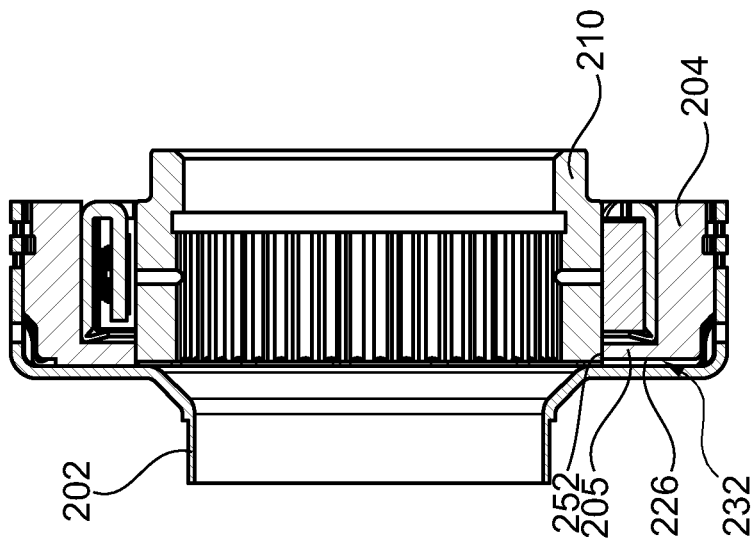
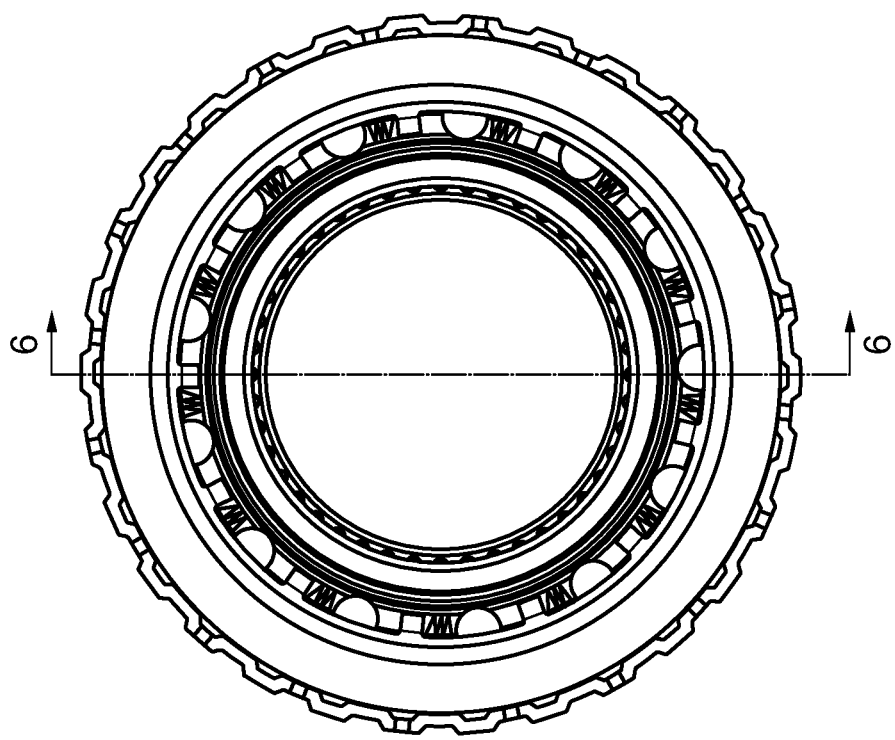

US 9,121,456 B2

ONE-WAY CLUTCH CARRIER ASSEMBLY

FIELD

The invention relates generally to a one-way clutch for a transmission, and more specifically to a one-way clutch assembled with a clutch carrier.

BACKGROUND

A component having inner and outer gearing is known from U.S. Patent Application Publication No. 2010/0137096 A1 to Illerhaus et al. That application relates to a recommended configuration for a component with inner and outer teeth in which the inner teeth are integral with a base body and the outer teeth are an added part. A roller freewheel, or one-way clutch, is known from commonly-assigned U.S. Pat. No. 7,690,488.

BRIEF SUMMARY

Example aspects broadly comprise a one-way clutch carrier assembly for a transmission including an outer ring and a carrier. The outer ring has an outer surface with radially extending teeth. The carrier circumscribes the outer ring. The carrier has an undulating outer surface with teeth for receiving a plurality of clutch plates, an undulating inner surface with teeth for receiving the outer ring teeth, and an inwardly extending tab for limiting axial displacement of the outer ring in the carrier. In an example embodiment, the outer ring includes a first circumferential surface with a first radius and a second circumferential surface with a second radius, larger than the first radius. The carrier inwardly extending tab has a third radius that is smaller than the second radius.

In an example embodiment, the carrier is made from sheet steel such that a radial distance between the undulating inner and outer surfaces is substantially constant along a circumference of the carrier. In some example embodiments, the one-way clutch assembly includes a cartridge assembly and an inner race. The cartridge assembly includes an outer race pressed into the outer ring and a plurality of blocking elements. The inner race is engaged with the blocking elements such that the inner race is selectively lockable to the outer ring.

In some example embodiments, the outer ring includes an inwardly extending ring or the inner race includes an outwardly extending ring, for centering the inner race relative to the outer ring. In an example embodiment, the inwardly extending ring or the outwardly extending ring includes a radial wall with a plurality of lubrication grooves. In some example embodiments, the one-way clutch carrier assembly includes a centering ring extending between the inner race and the outer ring for centering the inner race relative to the outer ring. In some example embodiments, the centering ring includes an inner cylindrical portion proximate the inner race, an outer cylindrical portion proximate the outer ring, and a center portion connecting the inner and outer cylindrical portions. In an example embodiment, the center portion includes a radial wall or a conical wall.

In some example embodiments, the carrier or the inner race includes a spline for engaging a transmission component. In an example embodiment, the transmission component is press-fit into the spline. In an example embodiment, the inner race includes an outer circumferential surface engaged with the blocking elements, an inner splined surface for engaging a transmission shaft, and a lubrication channel extending from the inner surface to the outer surface.

BRIEF DESCRIPTION OF THE DRAWINGS

The nature and mode of operation of the present invention will now be more fully described in the following detailed description taken with the accompanying drawing figures, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

FIG. 5 is a front view of a one-way clutch carrier assembly according to an example aspect;

FIG. 6 is a section view of the one-way clutch carrier assembly of FIG. 5 taken generally along line 6-6 in FIG. 5;

DETAILED DESCRIPTION

Figure 3:
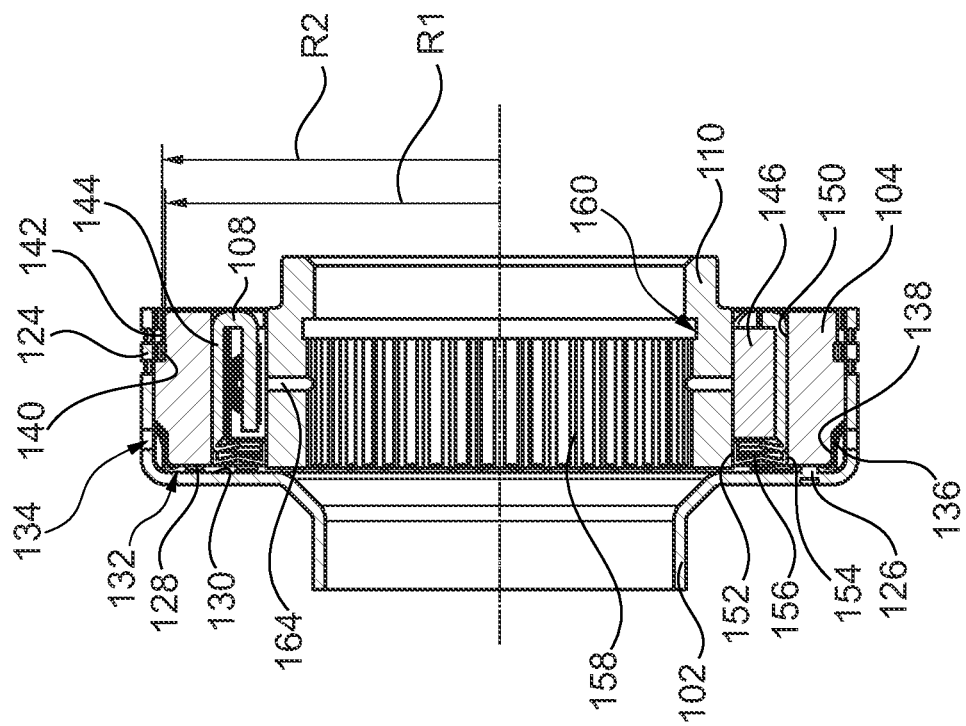
FIG. 3 is a section view of the one-way clutch carrier assembly of FIG. 2 taken generally along line 3-3 in FIG. 2.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
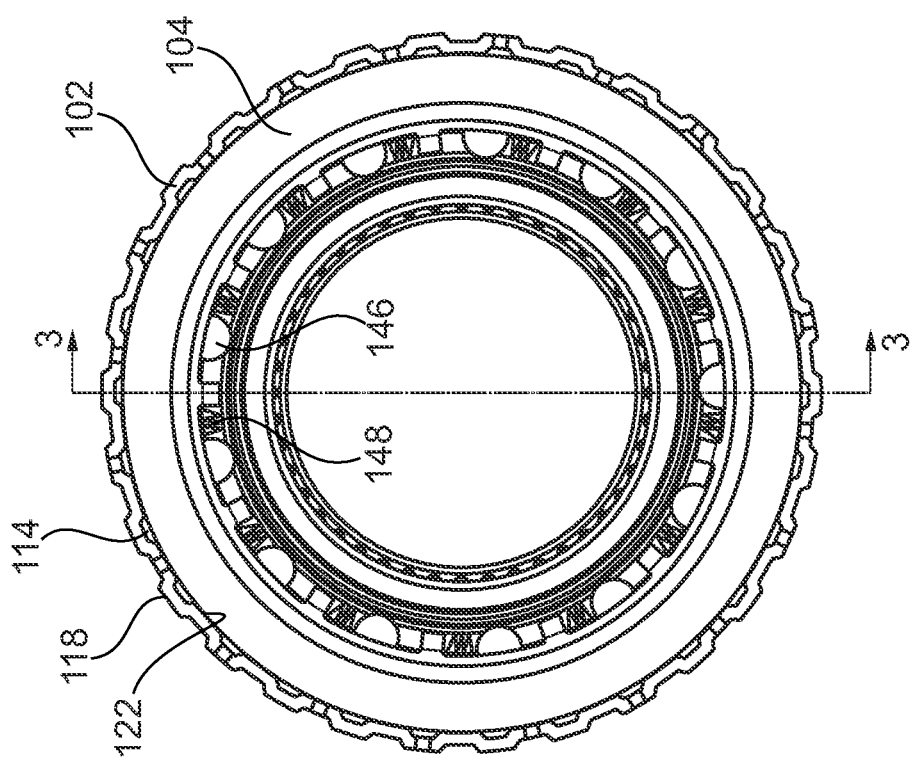
FIG. 2 is a front view of a one-way clutch carrier assembly according to an example aspect.
Figure 4:
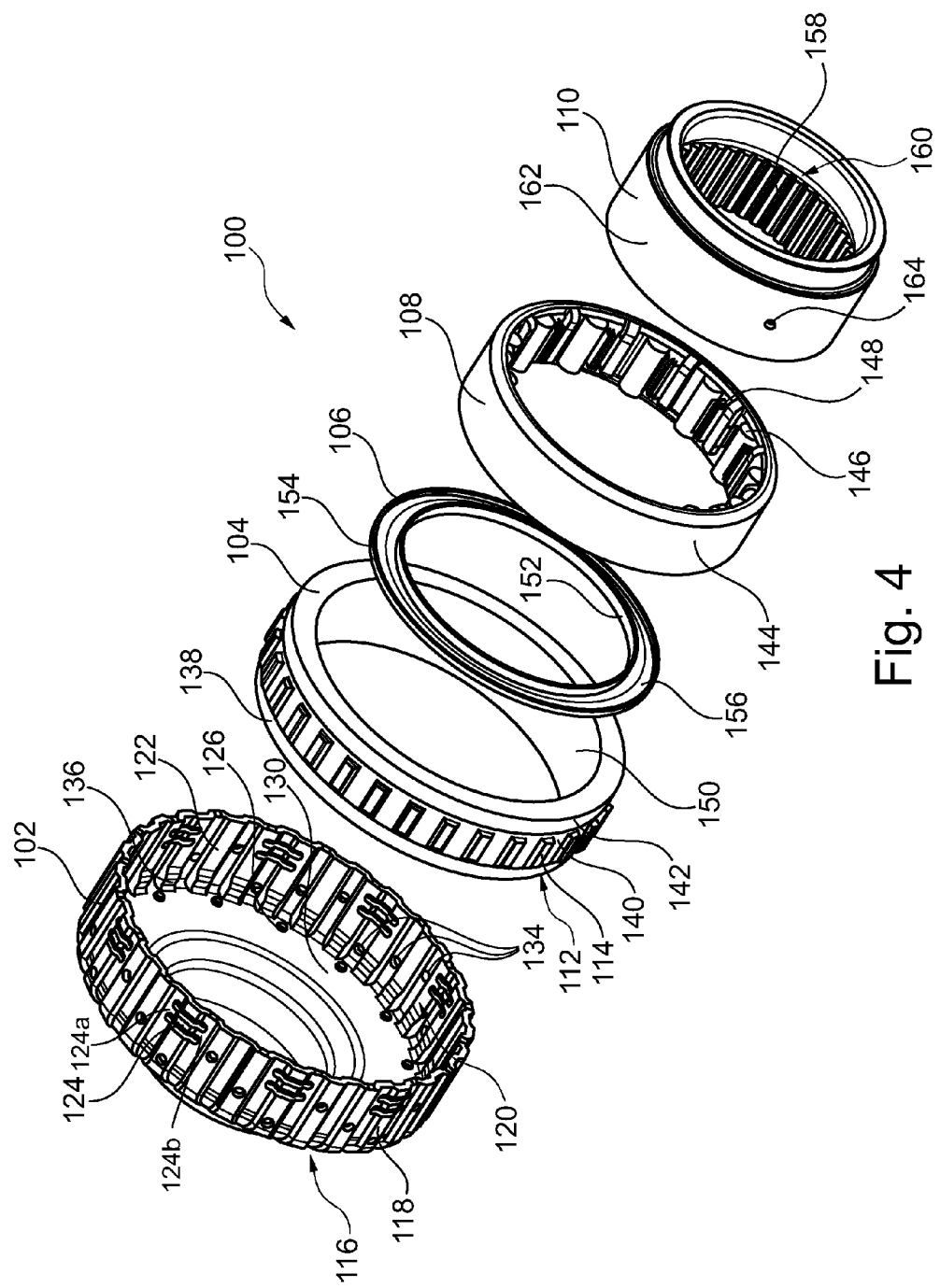
FIG. 4 is an exploded perspective view of the one-way clutch carrier assembly of FIG. 2.

The following description is made with reference to FIGS. 2-4. FIG. 2 is a front view of one-way clutch carrier assembly 100 according to an example aspect. FIG. 3 is a section view of the one-way clutch carrier assembly of FIG. 2 taken generally along line 3-3 in FIG. 2. FIG. 4 is an exploded perspective view of the one-way clutch carrier assembly of FIG. 2. One-way clutch carrier assembly 100 includes carrier 102, outer ring 104, centering ring 106, cartridge assembly 108, and inner race 110. Outer ring 104 includes outer surface 112 with radially extending teeth 114. Carrier 102 circumscribes outer ring 104. Carrier 102 includes undulating outer surface 116 with teeth 118 for receiving a plurality of clutch plates (not shown), and undulating inner surface 120 with teeth 122 for receiving outer ring teeth 114.

Inwardly extending tab 124, having first and second ends 124a and 124b, limits axial displacement of the outer ring in the carrier as described below. Carrier 102 includes integral protrusions, or standoffs, 126 for providing a cooling flow path between the carrier and ring 104. That is, when ring 104 is installed in the carrier, protrusions 126 prevent ring surface 128 from contacting carrier surface 130, providing flow channel 132 for a cooling flow. Holes 134 provide a radial path for cooling flow to escape the carrier to cool the clutch plates.

Carrier 102 includes stepped portion 136 and ring 104 includes circumferential surface 138. Portion 136 and surface 138 cooperate to center the ring in the carrier. That is, because it is difficult to center the components at the toothed connection, portion 136 and surface 138 maintain a tight radial clearance, while teeth 114 and 122 have a greater clearance, ensuring that the parts will be centered relative to one another. Portion 136 may include a toothed profile with an inside radius smaller than that of teeth 122, for example.

Outer ring 104 includes circumferential surface 140 with radius R1 and circumferential surface 142 with radius R2. As shown in FIG. 3, R2 is greater than R1. Tab 124 includes a third radius (not shown) that is larger than R1 and smaller than R2. Tab 124 is shown in an undeformed position in the figures but, once ring 104 is installed in the carrier, tab 124 is radially depressed to axially lock the ring to the carrier. In other words, the tab is radially depressed below a step height of radius R2 so that attempts to axially remove the ring from the carrier push a radial wall of the tab against a radial wall joining surfaces 140 and 142, preventing removal of the ring.

Cartridge assembly 108 includes outer race 144, blocking elements 146 and springs 148 urging the blocking elements to contact ramps (not shown) in the outer race. In the example embodiment shown in the figures, the blocking elements are rollers. In an example embodiment (not shown), the blocking elements are sprag elements. The outer race is pressed into the outer ring. That is, during assembly of one-way clutch carrier assembly 100, outer race 144 must be forcefully inserted into an inner surface 150 of outer ring 104.

During a locking mode of the cartridge assembly, rollers 146 are wedged between inner race 110 and outer race 144, and ring 104 provides radial strength to the assembly. Wedging by the rollers increases a normal force acting between the outer race and the outer ring, reducing the likelihood of slippage between the components. Inner race 110 is engaged with blocking elements 146 such that the inner race is selectively lockable to the outer ring. So, as is common with one-way clutch assemblies, the inner race and clutch carrier may be locked for rotation in a first direction, and freely rotatable in a second direction, opposite the first direction.

Centering ring 106 extends between inner race 108 and outer ring 104 for centering the inner race relative to the outer ring. Ring 106 includes inner cylindrical portion 152 proximate the inner race, an outer cylindrical portion 154 proximate the outer ring, and center portion 156 connecting the inner and outer cylindrical portions. Center portion 156 includes a conical wall. A conical wall may allow improved sizing tolerances on portions 152 and 156 by providing a compressible segment that can be used to adjust diameters of the cylindrical portions. In other embodiments (not shown), portion 156 may include a radial wall.

Carrier 102 may include a spline (not shown) for engaging a transmission component such as a spline or planetary sun gear, for example. Inner race 110 includes spline 158 for engaging a transmission component. The transmission component may be fixed to a housing of the transmission and therefore, not rotatable. In an example embodiment, the transmission component is made of a softer material than that of the inner race (e.g., aluminum) and the component is forcefully installed, or press-fit, into the inner race. Inner race 110 includes groove 160 for receiving metal chips cut from the component during the press-fit operation Inner race 110 includes outer circumferential surface 162 engaged with blocking elements 146 and channel 164 extending from spline 158 to surface 162 for providing lubricating fluid to the blocking elements.

Figure 7:
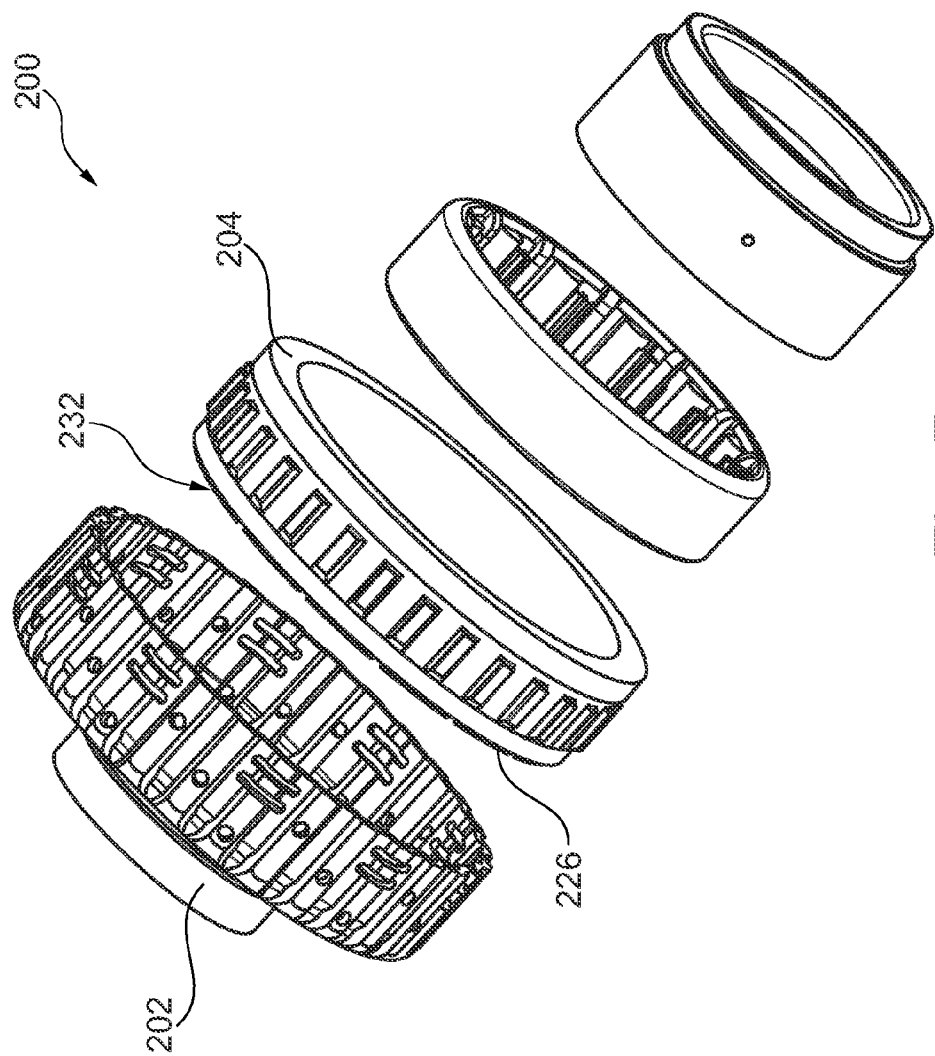
FIG. 7 is an exploded perspective view of the one-way clutch carrier assembly of FIG. 5.

The following description is made with reference to FIGS. 5-7. FIG. 5 is a front view of one-way clutch carrier assembly 200 according to an example aspect. FIG. 6 is a section view of the one-way clutch carrier assembly of FIG. 5 taken generally along line 6-6 in FIG. 5. FIG. 7 is an exploded perspective view of the one-way clutch carrier assembly of FIG. 5. One-way clutch carrier assembly 200 differs from one-way clutch carrier assembly 100 with regards to centering, but is otherwise comparable.

Centering ring 106 extends between inner race 110 and outer ring 104 for centering the inner race relative to the outer ring. Ring 106 includes inner cylindrical portion 152 proximate the inner race, an outer cylindrical portion 154 proximate the outer ring, and center portion 156 connecting the inner and outer cylindrical portions. Center portion 156 includes a conical wall. A conical wall may allow improved sizing tolerances on portions 152 and 156 by providing a compressible segment that can be used to adjust diameters of the cylindrical portions. In other embodiments (not shown), portion 156 may include a radial wall.

The disclosed one-way clutch carrier assemblies may be used in a planetary automatic transmission, for example. Because the carrier combines several functions in one component, manufacturing costs may be reduced. For example, the carrier includes formed teeth for receiving the clutch plates, a hub spline for driving engagement with a shaft, and formed teeth with a radial tab for receiving a clutch ring, saving costly joining processes. Furthermore, the carrier inner and outer teeth may be formed by stamping, further reducing costs. That is, in an example embodiment, the carrier is made from sheet steel such that a radial distance between the undulating inner and outer surfaces is substantially constant along a circumference of the carrier. The outer ring may be manufactured from formed powdered metal, for example.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A one-way clutch carrier assembly for a transmission comprising:
    an outer ring including an outer surface with radially extending teeth;
    a cartridge assembly including an outer race pressed into the outer ring, and a plurality of blocking elements;
    an inner race engaged with the blocking elements such that the inner race is selectively lockable to the outer ring; and,
    a carrier, circumscribing the outer ring, including:
        an undulating outer surface with teeth for receiving a plurality of clutch plates;
        an undulating inner surface with teeth for matingly engaging the outer ring radially extending teeth; and,
        an inwardly extending tab for limiting axial displacement of the outer ring in the carrier; the inwardly extending tab having circumferentially aligned first and second ends each connected to the undulating outer surface.

2. The one-way clutch carrier assembly of claim 1 wherein:
    the outer ring includes:
        a first circumferential surface with a first radius; and, a second circumferential surface with a second radius, larger than the first radius;
    the carrier inwardly extending tab includes a third radius; and,
    the third radius is larger than the first radius and smaller than the second radius.

3. The one-way clutch carrier assembly of claim 1 wherein the carrier is made from sheet steel such that a radial distance between the undulating inner and outer surfaces is substantially constant along a circumference of the carrier.

4. The one-way clutch carrier assembly of claim 1 wherein the outer ring includes an inwardly extending ring or the inner race includes an outwardly extending ring, for centering the inner race relative to the outer ring.

5. The one-way clutch carrier assembly of claim 4 wherein the inwardly extending ring or the outwardly extending ring includes a radial wall with a plurality of lubrication grooves.

6. The one-way clutch carrier assembly of claim 1 further comprising a centering ring extending between the inner race and the outer ring for centering the inner race relative to the outer ring.

7. The one-way clutch carrier assembly of claim 6 wherein the centering ring includes:
    an inner cylindrical portion proximate the inner race;
    an outer cylindrical portion proximate the outer ring; and,
    a center portion connecting the inner and outer cylindrical portions.

8. The one-way clutch carrier assembly of claim 7 wherein the center portion includes a radial wall or a conical wall.

9. The one-way clutch carrier assembly of claim 1 wherein the carrier or the inner race includes a spline for engaging a transmission component.

10. The one-way clutch carrier assembly of claim 9 further comprising a transmission component wherein the transmission component is press-fit into the spline.

11. The one-way clutch carrier assembly of claim 1 wherein the inner race includes:
    an outer circumferential surface engaged with the blocking elements;
    a splined surface for engaging a transmission component; and,
    a lubrication channel extending from the inner surface to the outer surface.

12. The one-way clutch carrier assembly of claim 1 wherein the first and seconds ends are disposed between the undulating outer surface teeth.

13. The one-way clutch carrier assembly of claim 2 wherein the inwardly extending tab is deformable to the third radius, wherein the radius is radially aligned with the undulating outer surface teeth.

* * * * *